Feb. 6, 1934. J. ANDRÉS Y HERNANDEZ 1,945,637
FAUCET
Filed March 22, 1932
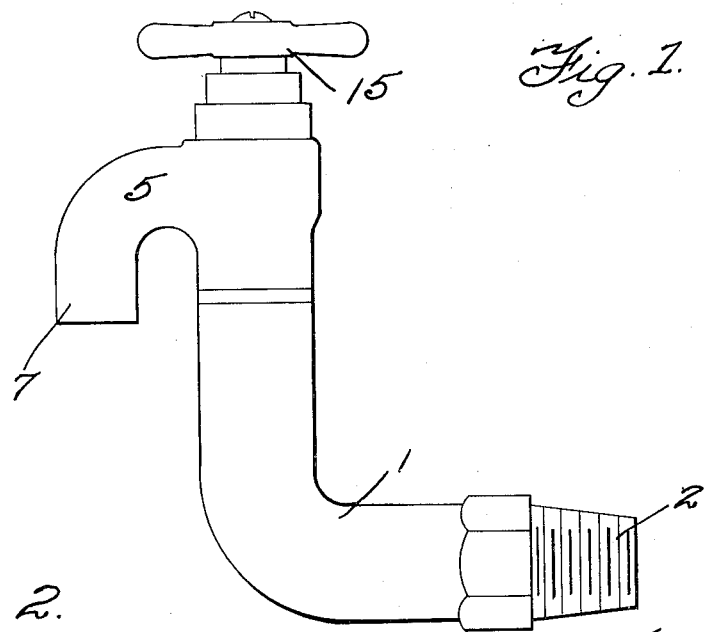
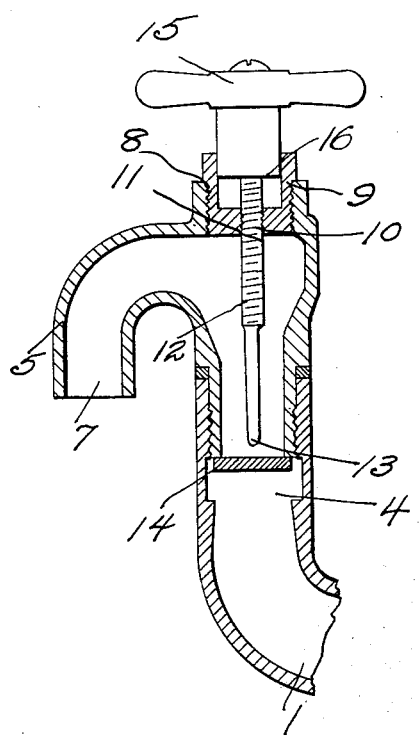
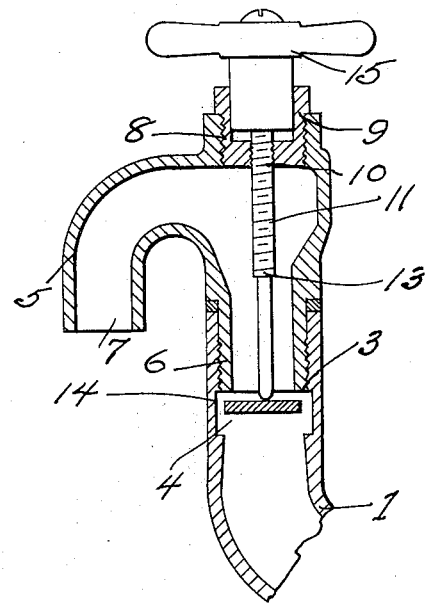
Inventor
José Andres y Hernondez Patented Feb. 6, 1934

1,945,637

UNITED STATES PATENT OFFICE 1,945,637

FAUCET

José Andrés y Hernandez, Habana, Cuba

Application March 22, 1932. Serial No. 600,542

2 Claims. (Cl. 251—140)

This invention relates to improvements in faucets.

The prime object of the invention is to provide a faucet, the valve of which is automatically closed by the pressure of the liquid when pressure of the operating handle is removed.

A further object of the invention is to provide a faucet, the valve of which is so arranged that the use of springs, washers, etc. are unnecessary, thus avoiding the usual wear on the parts.

The invention also comprehends improvements in the construction and arrangement of parts as will be hereinafter described and particularly pointed out in the claims.

In the drawing:—

Figure 1 is a side elevation of the improved faucet.

Figure 2 is a central vertical section of the faucet, showing the valve in closed position.

Figure 3 is a similar view, showing the valve in open position.

In the drawing, the numeral 1 indicates a lower section of the faucet, same being threaded at its extremity at 2 to readily facilitate attachment to a water supply. The opposite end of the section 1 is interiorly threaded at 3, and below the threaded portion is an enlargement to form a valve chamber 4.

5 indicates an upper faucet section provided at one extremity with threads 6 which engage the threads 3 of section 1, while the opposite extremity of the section 5 is formed into a spout 7. The section 5 is formed with a threaded opening 8 to receive a packing gland 9 having a threaded opening 10, through which passes the threaded portion 11 of a stem 12. The lower end of the stem 12 is reduced, as at 13, to form a valve operating member.

Located in the valve chamber 4 below the operating point of the stem is a disk valve 14 adapted to fit snugly against the lower end of the upper section 5 of the faucet when in one position, the disk at all times being confined within the valve chamber. The disk valve may be formed of glass, metal or gutta-percha or the like material, it being essential, however, that it be flat and of less diameter than the diameter of the valve chamber.

In use, assuming the parts are in normal or closed position, as shown in Figure 2, the disk valve is forced up against the bottom of the faucet section 5 by the pressure of the liquid in the lower section, the operating point of the stem at this time being entirely free from contact with the disk. Thus, it will be seen the flow of water from the supply pipe closes the valve. To open the valve, for the free passage of liquid, the operating stem is screwed down by turning the handle 15 until the operating point contacts with the disk and forces same out of contact with its seat, as best shown in Figure 3. The valve is opened against the pressure of the flow of liquid, and the position of the valve is limited by the shoulder 16 on the stem contacting with the stuffing box 9.

From the foregoing description, it will be seen that I have provided a simple and inexpensive faucet and one entirely free of the usual springs, washers or the like common in faucets of this general type. The valve operating point may engage the disk valve to allow as small a flow of liquid as may be desired, or it may be forced open to allow the full flow, this depending entirely upon the supply needed. Furthermore, while the pressure of the liquid on and around the disk is uniform, the valve will ordinarily open in a way to provide a uniform passage for the flow of liquid, yet as the disk valve is practically a floating element in the valve chamber, it may tilt under the action of the liquid flow, but this is quite immaterial.

What I claim is:—

1. A faucet constructed in two sections, the lower section having an upper interiorly threaded open end and a circumferentially enlarged chamber below the threaded portion to provide a valve chamber, the upper section having a threaded terminal to cooperate with the threaded end of the lower section, the free end of the upper section forming a valve seat at the upper end of the valve chamber, a flat disk-like valve operative within the valve chamber and cooperating in one position with said seat, said disk valve having a diameter less than the interior diameter of the threaded portion of the lower section and greater than the interior diameter of the lower threaded portion of the upper section, and means having threaded cooperation with the upper section to engage said valve and move it into the valve chamber and away from the seat.

2. A faucet comprising a casing composed of a lower section threaded at one end and provided below the threaded portion with a valve chamber, and an upper section threaded into the threaded end of the lower section, the lower end of the upper section forming one wall of the valve chamber and also forming a valve seat, a floating flat disk valve in the valve chamber, a stem threaded in the upper section in alignment with the flat disk valve, the stem having a reduced lower end to form a valve operating point normally spaced from the flat valve when the latter is held in contact with the valve seat by the pressure of liquid flowing to the faucet, the valve being opened by operating the stem to engage the disk valve and remove same from its seat.

JOSÉ ANDRÉS Y HERNANDEZ.